(12) United States Patent
Akita

(10) Patent No.: US 6,952,634 B2
(45) Date of Patent: *Oct. 4, 2005

(54) REAR-WHEEL STEERING ANGLE CONTROL DEVICE

(75) Inventor: Tokihiko Akita, Nagoya (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 92 days.

This patent is subject to a terminal disclaimer.

(21) Appl. No.: 10/214,762

(22) Filed: Aug. 9, 2002

(65) Prior Publication Data

US 2003/0040857 A1 Feb. 27, 2003

(30) Foreign Application Priority Data

Aug. 9, 2001 (JP) .......................................... 2001-242842

(51) Int. Cl.⁷ .............................. B62D 5/04; B60T 8/32
(52) U.S. Cl. ............................. 701/41; 701/42; 701/70; 180/140; 180/141; 180/791; 303/146
(58) Field of Search ............................... 701/41, 42, 70; 180/140, 141, 791, 445, 446; 303/122, 146

(56) References Cited

U.S. PATENT DOCUMENTS

| 4,706,978 A | 11/1987 | Ito |
| 5,457,632 A | * 10/1995 | Tagawa et al. ............. 180/791 |
| 5,816,669 A | * 10/1998 | Hiwatashi et al. ......... 303/140 |
| 5,879,061 A | * 3/1999 | Koibuchi .................... 303/146 |
| 5,957,987 A | * 9/1999 | Sudo et al. .................. 701/41 |
| 6,397,135 B1 | * 5/2002 | Akita ........................ 701/41 |

OTHER PUBLICATIONS

"The Proceedings of Japanese Society of Automotive Engineering," 882, Oct., 1988, pp. 419–422.

* cited by examiner

Primary Examiner—Gertrude A. Jeanglaude
(74) Attorney, Agent, or Firm—Burns, Doane, Swecker & Mathis, L.L.P.

(57) ABSTRACT

A rear-wheel steering angle control device includes a target rear-wheel steering angle calculating means for calculating a target rear-wheel steering angle based upon the detection by a detecting means. The target rear-wheel steering angle calculating means further calculates an averaged locus by averaging a front end point running locus based upon a sample point memorized by a front end point locus memorizing means. The target rear-wheel steering angle calculating means still further limits the target rear-wheel steering angle not to deviate a vehicle rear end point from an inner range of the averaged locus.

16 Claims, 13 Drawing Sheets

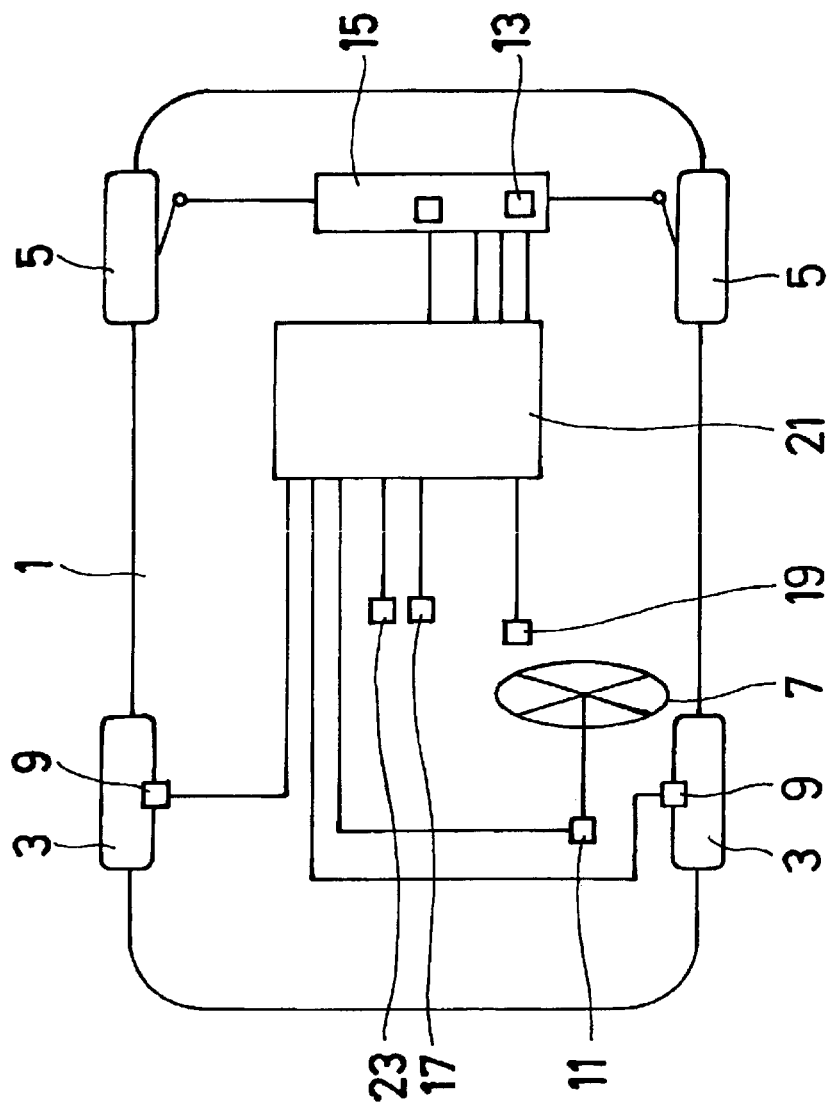

Fig.2

$\delta f$ : front-wheel steering angle (rad)
$\delta r$ : rear-wheel sttering angle (rad)
$L$ : wheel base (=Lf+Lr,m)
$Lf$ : vehicle longitudinal length between a vehicle center of gravity and a front-wheel (m)
$Lr$ : vehicle longitudinal length between a vehicle center of gravity and a rear-wheel (m)
$Le$ : vehicle entire longitudinal length (=Lfe+Lre,m)
$Lfe$ : vehicle longitudinal length between a vehicle center of gravity and a vehicle front end (m)
$Lre$ : vehicle longitudinal length between a vehicle center of gravity and a vehicle rear end (m)
$\beta b$ : vehicle slip angle (rad)
$\gamma$ : vehicle yaw rate (rad/sec)
$v$ : vehicle speed (m/s)
$Ts$ : control period (sec)
$Dx$ : sample distance (m)
$\delta r$ limit : discrete limited target rear-wheel steering angle (rad)
$\delta rt$ : target rear-wheel steering angle(rad)
$\delta rt0$ : normally controlled target rear-wheel steering angle(rad)
ratio_map(v) : rear-wheel / front-wheel steering angle ratio map
$\theta et$ : deviation angle (rad)
$\theta b$ : vehicle absolute angle (rad)
$\theta fe$ : front end point running direction angle (rad)
$\theta fea$ : front end point running direction angle on an averaged locus (rad)
$\theta fea0$ : previous value of a front end point running direction angle on an averaged locus (rad)
$\theta fear$ : front end point running direction angle on an averaged locus at the nearest point to a rear end point on an averaged locus (rad)

Fig.3

| Symbol | Definition |
|---|---|
| $\theta at$ | : front end point locus angle on an averaged locus (rad) |
| $\theta ato$ | : previous value of front end point locus angle on an averaged locus (rad) |
| $\theta re$ | : rear end point running direction angle (rad) |
| $\theta relimit$ | : limited rear end point running direction angle (rad) |
| $C1$ | : steering angle limiting gain |
| $k$ | : the number of pulses between a vehicle front end and a vehicle rear end ($k=Le/Dx$) |
| $t0$ | : the latest pulse inputting time (sec) |
| $t1$ | : previous pulse inputting time (sec) |
| $Td0$ | : pulse inputting interval at an early stage (sec) |
| $\delta rlimits$ | : continuous limited target rear-wheel steering angle (rad) |
| $\delta rlimits1$ | : previous $\delta rlimits$ |
| $\delta rlimit1$ | : discrete limited rear-wheel steering angle at time t1 (rad) |
| $\delta rlimitst0$ | : $\delta rlimits$ at t0 (rad) |
| $\delta rlimitst1$ | : $\delta rlimits$ at t1 (rad) |
| $\delta m$ | : actual rear-wheel steering angle (rad) |
| $k1$ | : the number of pulses between a locus dividing point and a vehicle front end ($k1=0 \sim k$) |
| $\theta fea1$ | : dividing point running direction angle on an averaged locus (rad) |
| $\theta fea1o$ | : previous value of a dividing point running direction angle on an averaged locus (rad) |
| $\theta fear1$ | : dividing point running direction angle on an averaged locus at the nearest point to a rear end point on an averaged locus (rad) |
| $\theta at1$ | : dividing point locus angle on an averaged locus (rad) |
| $\theta at1o$ | : previous value of a dividing point locus angle on an averaged locus (rad) |

REAR-WHEEL STEERING ANGLE CONTROL DEVICE

CROSS REFERENCE TO RELATED APPLICATIONS

This application is based on and claims priority under 35 U.S.C. § 119 with respect to a Japanese Patent Application 2001-212842, filed on Aug. 9, 2001, the entire content of which is incorporated herein by reference.

FIELD OF THE INVENTION

This invention generally relates to a rear-wheel steering angle control device for controlling a rear-wheel steering angle as well as a front-wheel steering angle in response to a vehicle driving condition, whereby a vehicle running stability can be improved. More particularly, this invention pertains to a rear-wheel steering angle control device for setting a target rear-wheel steering angle so as to avoid an occurrence of a swing-out at a vehicle rear end when a rear-wheel steering angle is controlled in an opposite direction to a front-wheel steering angle at a predetermined vehicle running speed or less than that.

BACKGROUND OF THE INVENTION

Various types of rear-wheal steering angle control devices have been already known, in which a vehicle running stability and a capability of a vehicle small turning circle can be improved by steering rear wheels as well as front wheels in response to the vehicle driving condition. According to this type of rear-wheel steering angle control device, it is a matter to be discussed how to set an optimal target rear-wheel steering angle relative to a front-wheel steering angle corresponding to every vehicle running condition.

For example, according to a column "7.5.3 4WS control for zero skid" at page 196 of a publication (this publication will be hereafter referred to as "publication No. 1") entitled "Steering and Dynamics" (date of publication of the first edition: Sep. 10, 1996, publishing office: SANKAIDO, Inc., author: KAYABA KOUGYO, Inc.), the following is disclosed. The vehicle slip angle (a deviation angle between a vehicle running direction and a vehicle longitudinal direction) is first recognized to be important to be focused on. The rear-wheel steering angle is controlled for always setting the vehicle slip angle to be zero. More specifically, when the vehicle speed is equal to a predetermined vehicle speed or less than that, the rear-wheel steering angle is controlled in an opposite direction to the front-wheel steering angle in proportion to the front-wheel steering angle, wherein a small turning circle can be ensured. On the other hand, when the vehicle speed is greater than the predetermined vehicle speed, the rear-wheel steering angle is controlled in the same direction as the front-wheel steering angle in proportion to the front-wheel steering angle so as to obtain an ideal vehicle dynamics with the superior driving stability of the vehicle. Hereinafter, this type of control will be referred to as a "steering angle proportional control".

As described above, when the steering angle proportional control is applied to the publication No. 1, the rear wheels are steered in the opposite direction to the front wheels when the vehicle speed is within a low speed rage as the vehicle leaves. Therefore, the capability of the small turning circle can be improved. However, the vehicle may become in touch with an obstacle at the vehicle side with the swing-out at the vehicle rear end (in particular, the corner portion of the vehicle rear end portion).

Therefore, to overcome the above described problem of the swing-out at the vehicle rear end ensuring the small turning circle, it is preferable that the rear-wheel steering angle is controlled to follow the vehicle rear end to a locus of a vehicle front end. This control is proposed, for example in a column "105 a control means for restraining a swing-out of a 4WS vehicle" of a publication entitled "The proceedings of Japanese Society of Automotive engineering 882, October, 1988" (this publication will be hereafter referred to as "publication No.2"). More specifically, the vehicle front end running locus is memorized at every predetermined sample distance. The rear-wheel steering angle is controlled for approximately corresponding the vehicle rear end running direction to the vehicle front end running direction at the nearest sample point to the then vehicle rear end among the whole sample points.

However, according to the control proposed in the publication 2, when the steering is turned as the vehicle leaves, the rear-wheel steering angle is first controlled in the same direction as the front-wheel steering angle and is then controlled in the opposite direction thereto. In this case, the driver may feel uncomfortable due to an occurrence of an excessive rear-wheel steering. Further, a consumption energy required for steering the rear wheels may be increased due to the occurrence of the excessive rear-wheel steering.

Accordingly, it is still susceptible of certain improvements with respect to providing an improved rear-wheel steering angle control device which can improve the vehicle small turning circle restraining the swing-out at the vehicle rear end under the vehicle low running speed. Therefore, the driver can be relieved from the uncomfortable driving feeling.

SUMMARY OF THE INVENTION

A rear-wheel steering angle control device includes a detecting means for detecting at least a vehicle speed, an actual front-wheel steering angle, and an actual rear-wheel steering angle, a target rear-wheel steering angle calculating means for calculating a target rear-wheel steering angle based upon the detection by the detecting means, a rear-wheel steering angle control means for controlling the actual rear-wheel steering angle detected by the detecting means to be approximately equal to the target rear-wheel steering angle calculated by the target rear-wheel steering angle calculating means.

The target rear-wheel steering angle calculating means includes a front end point locus memorizing means for setting one end of a line arranged to be parallel to a vehicle longitudinal direction and located at a vehicle front side as a front end point and setting the other end of the line located at a vehicle rear side as a rear end point and for memorizing a front end point running locus as a sample point at every predetermined sample distance, an averaged locus calculating means for calculating an averaged locus by averaging the front end point running locus based upon the sample point memorized by the front end point locus memorizing means, and a target rear-wheel steering angle limiting means for limiting the target rear-wheel steering angle not to deviate the rear end point from an inner range of the averaged locus.

BRIEF DESCRIPTION OF THE DRAWING FIGURES

The foregoing and additional features and characteristics of the present invention will become more apparent from the following detailed description considered with reference to the accompanying drawing figures wherein:

FIG. 1 is a concept drawing illustrating a 4WS vehicle provided with a rear-wheel steering angle control device according to the present invention;

FIG. 2 illustrates the correspondence of various physical quantities related to the vehicle to the symbols therefore;

Figure 4:
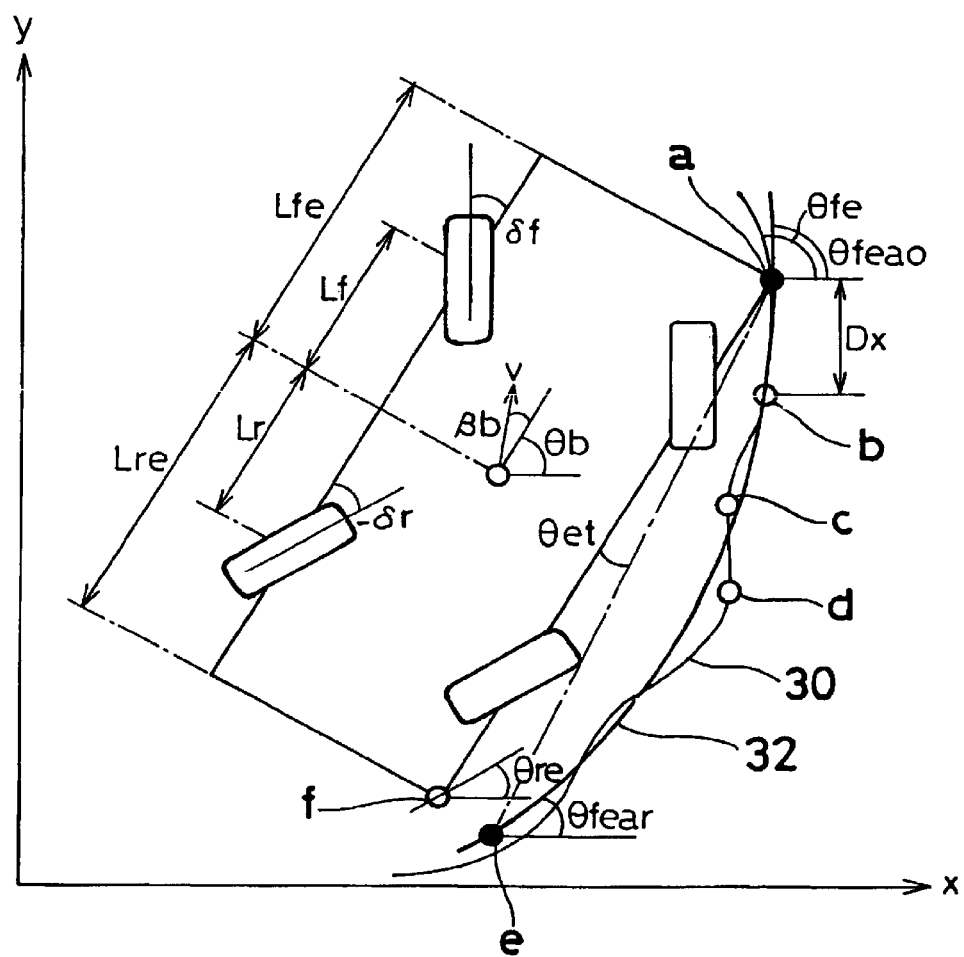
Figure 5:
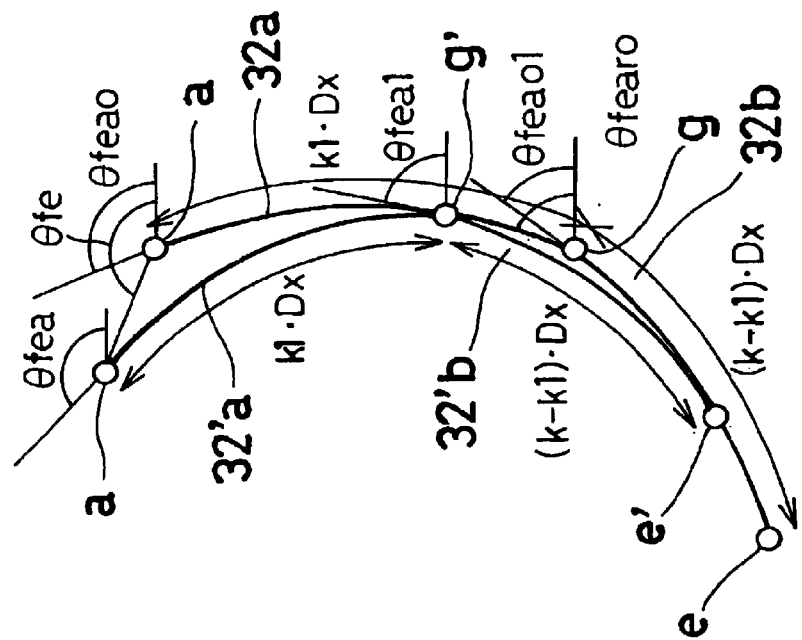
Figure 6:
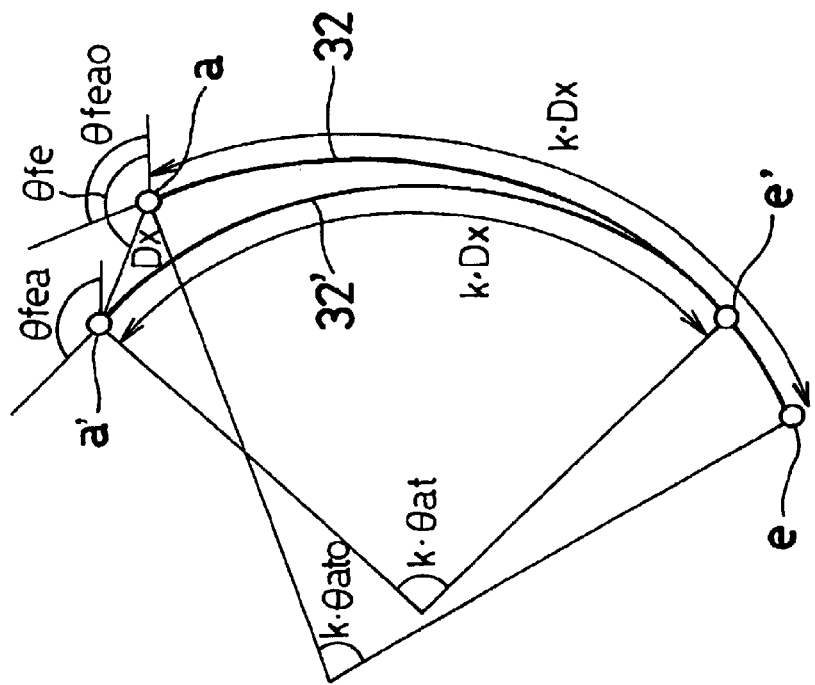
Figure 7:
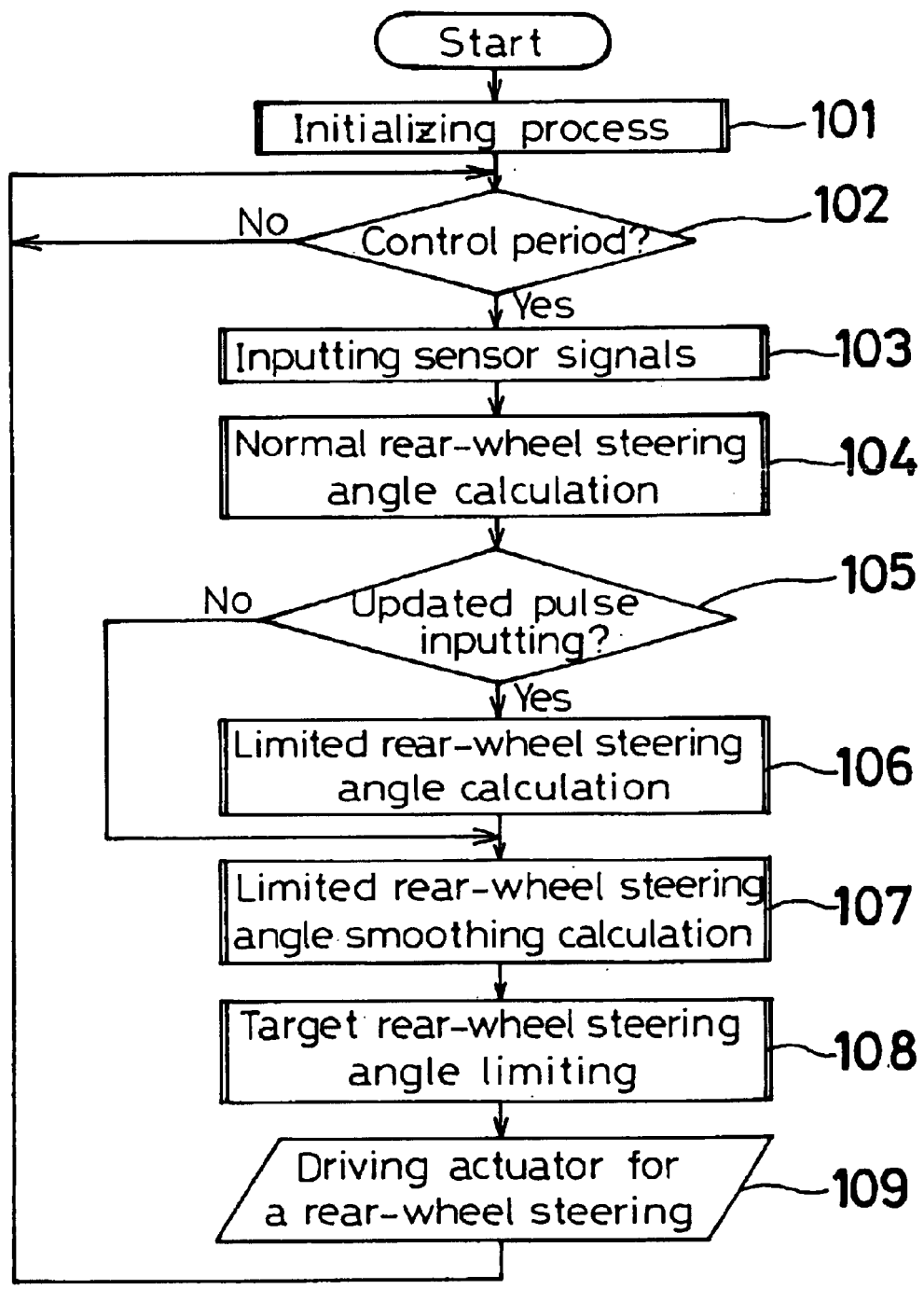
Figure 8:
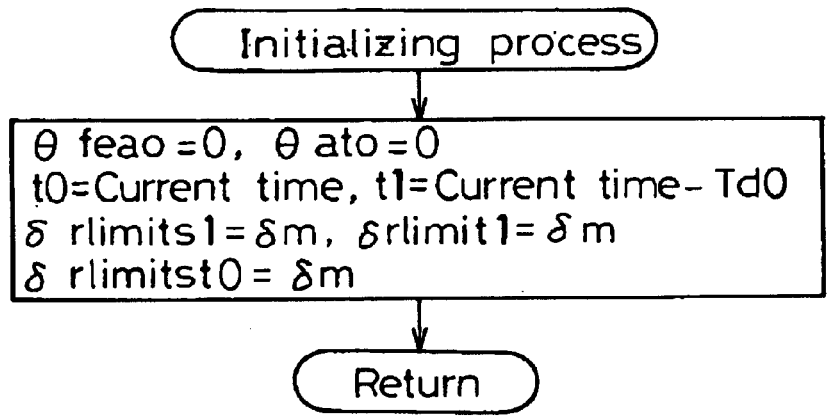
Figure 9:
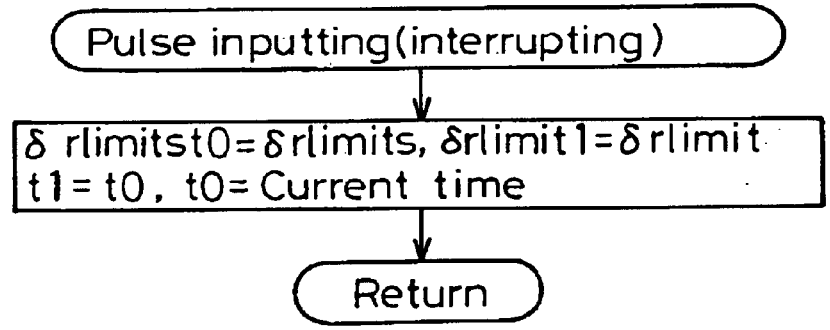
Figure 10:
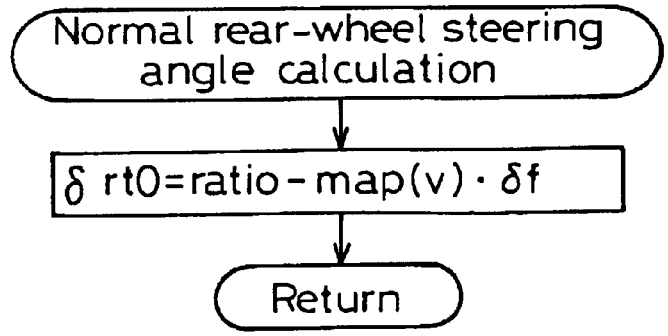
Figure 11:
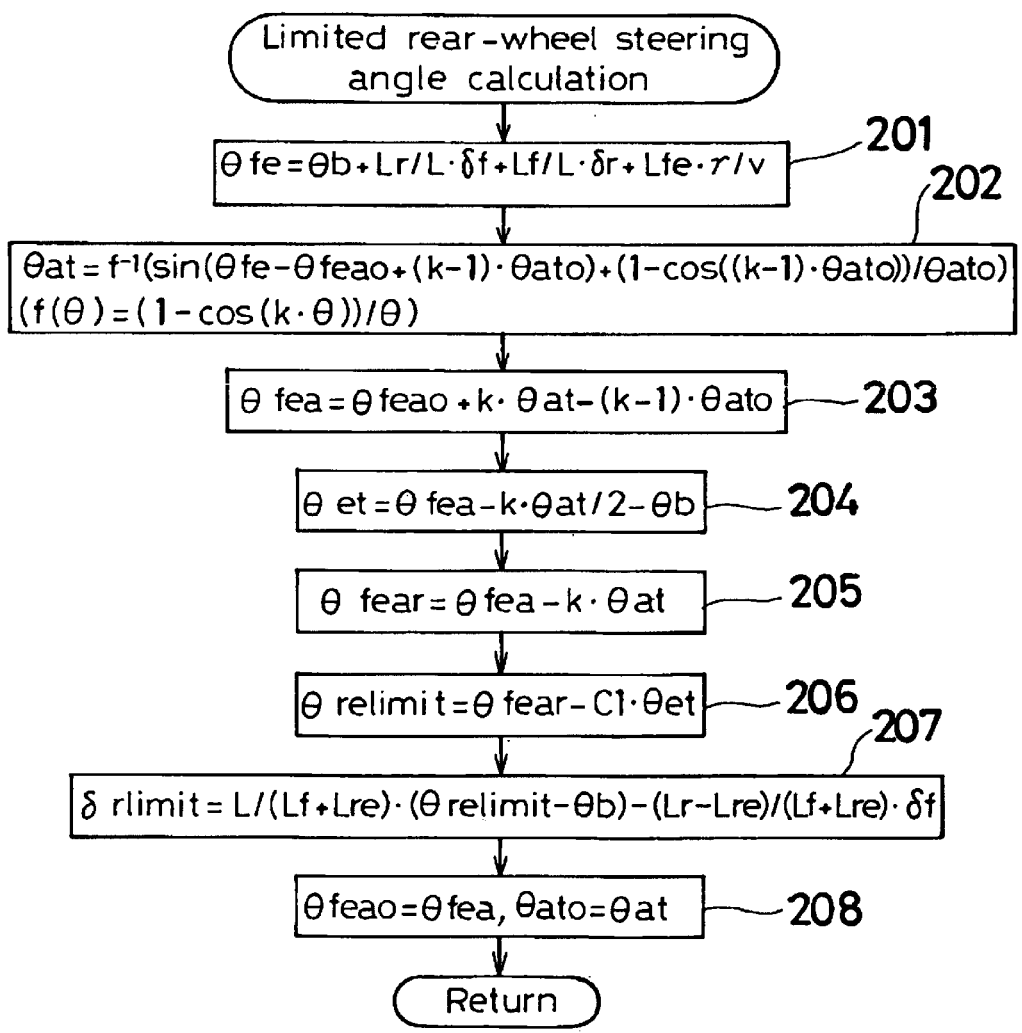
Figure 12:
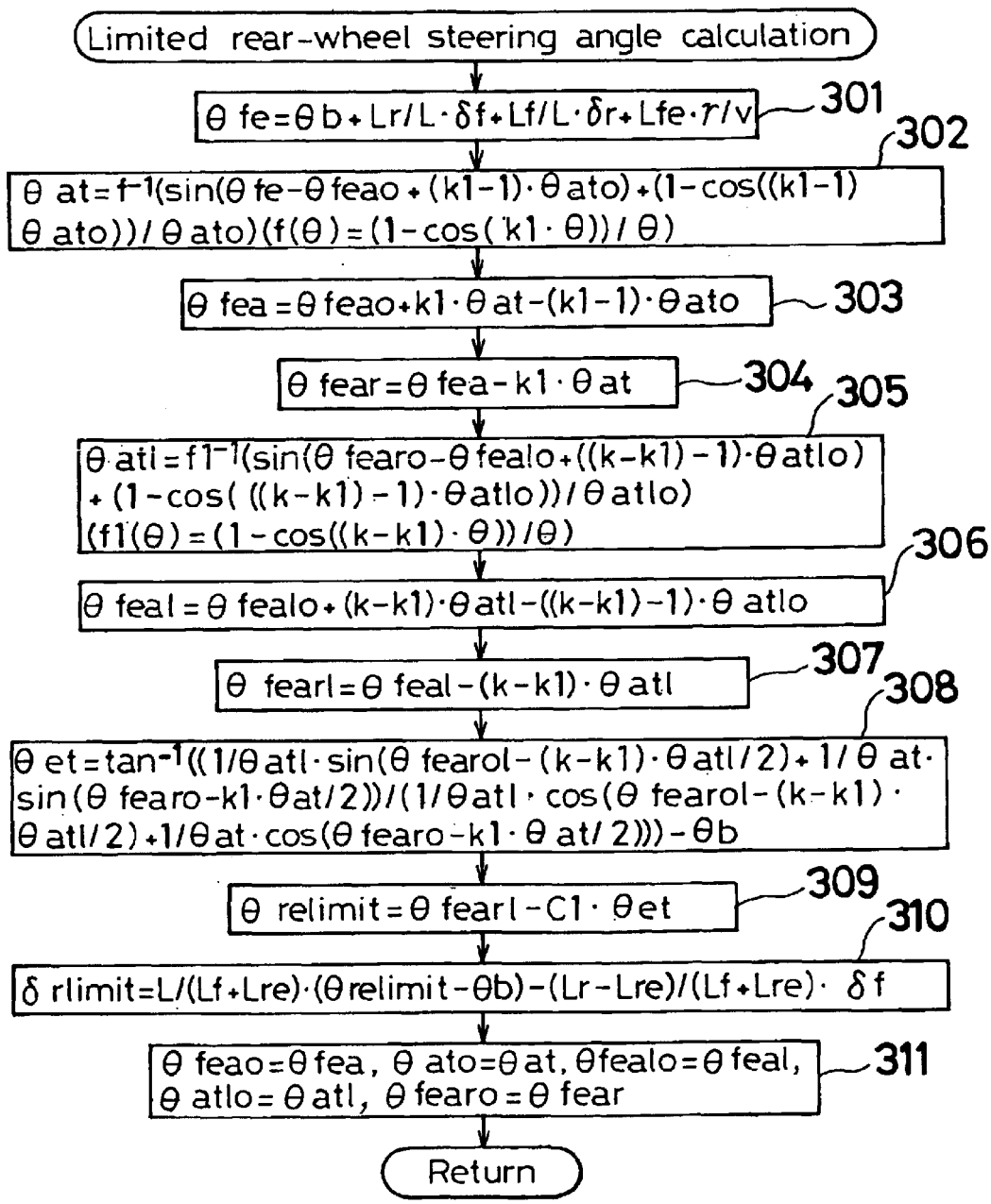
Figure 13:
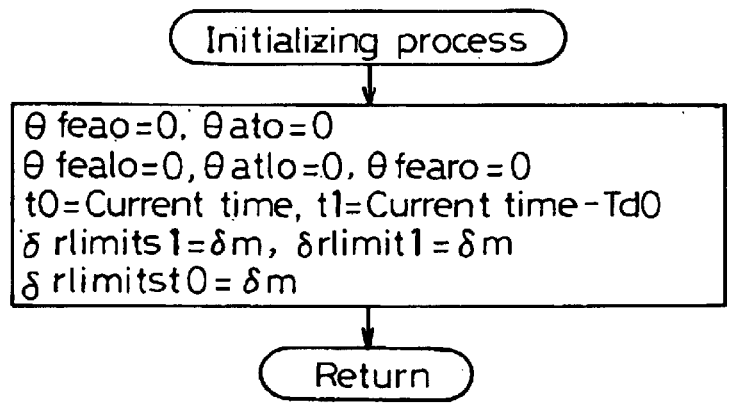
Figure 14:
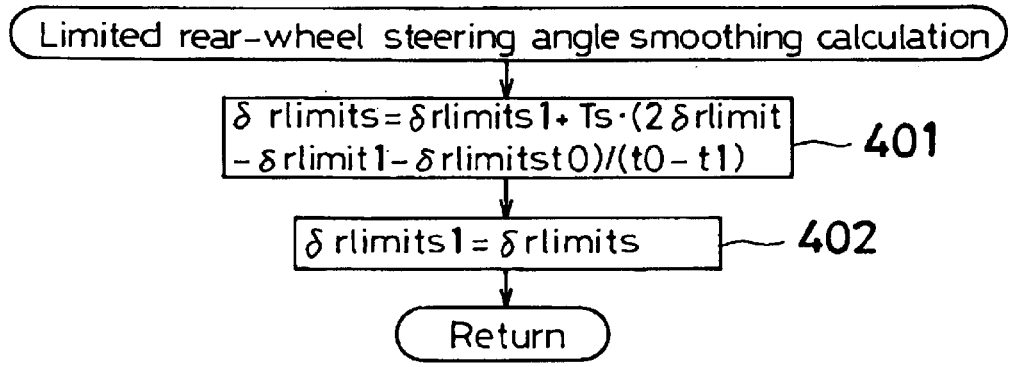
Figure 15:
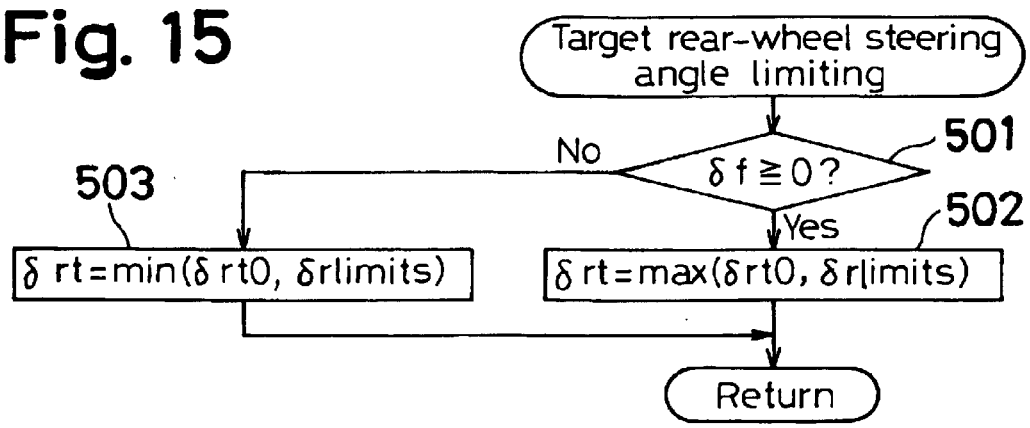
Figure 16:
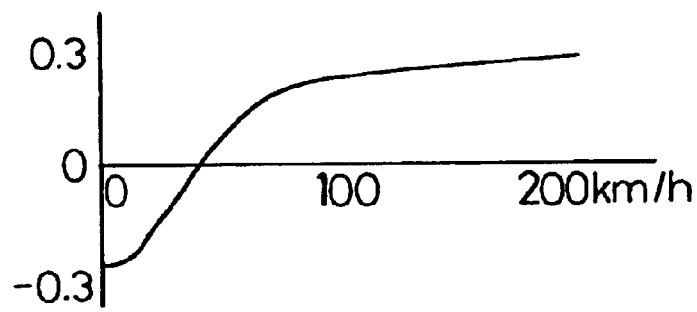
Figure 17:
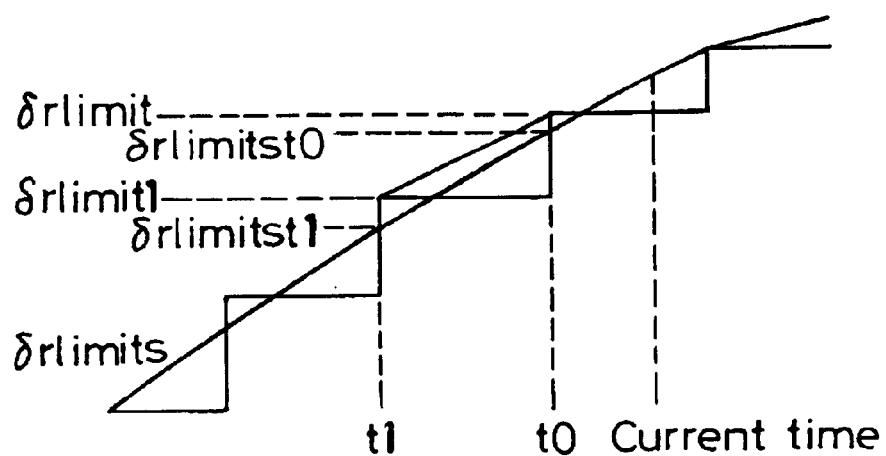
Figure 18:
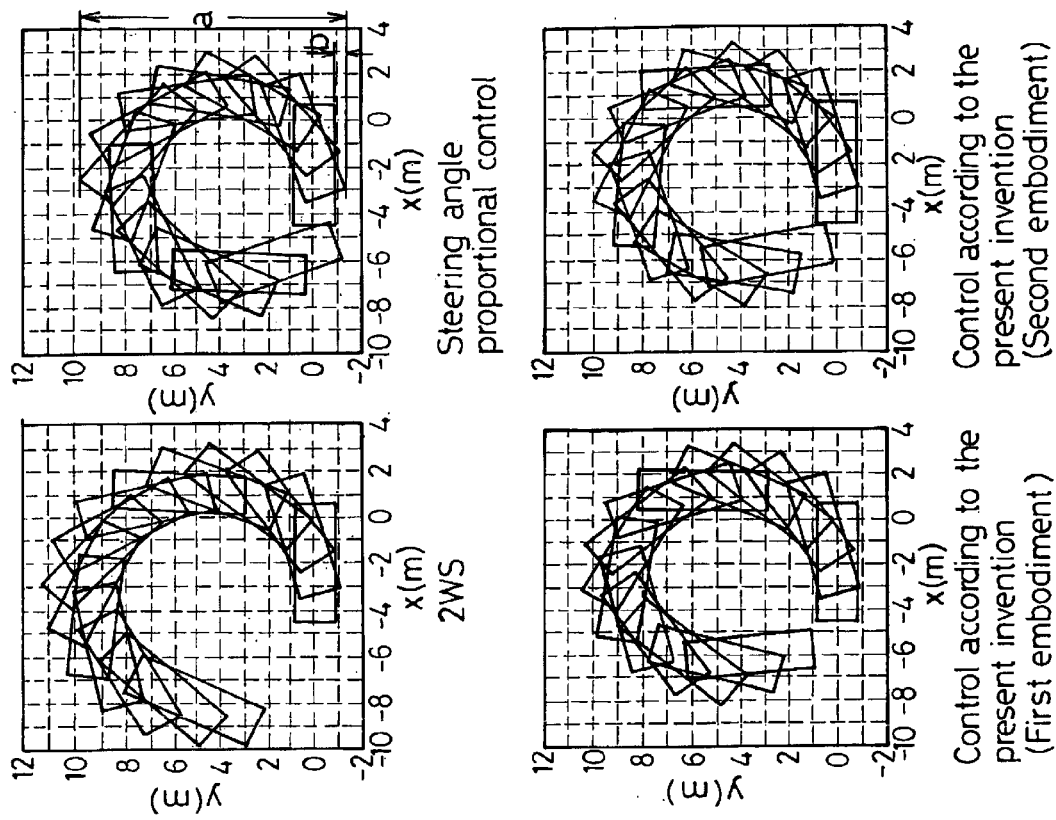
Figure 19:
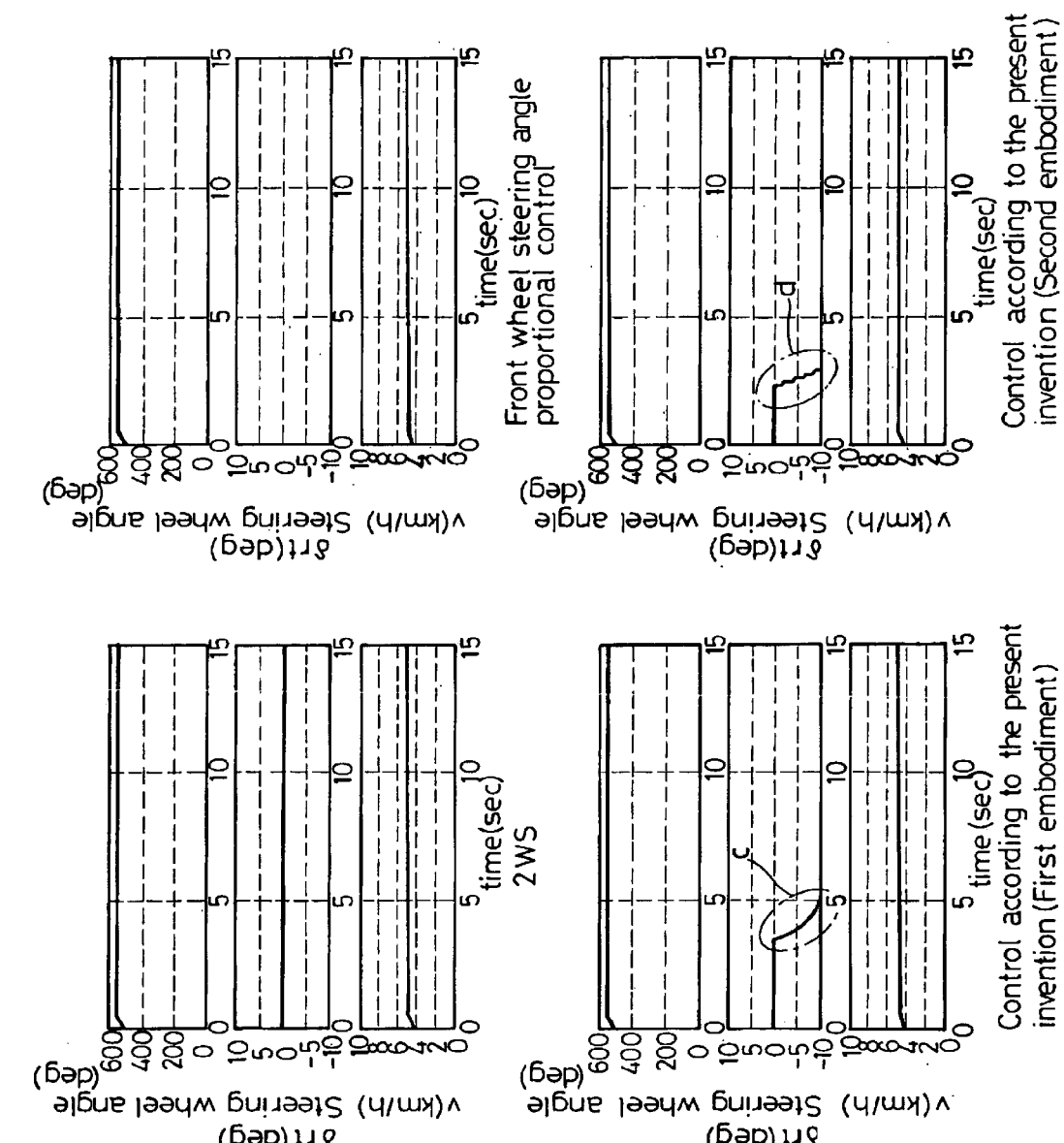

FIG. 3 also illustrates the correspondence of various physical quantities related to the vehicle to the symbols therefore, FIG. 4 is a model view of the vehicle visually representing the various physical quantities;

FIG. 5 is a pattern diagram illustrating an updating process of an arc 32 (referring to FIG. 4) of an averaged locus averaging a front end point running locus at every time the latest sample point is updated according to a first embodiment of the present invention;

FIG. 6 is a pattern diagram illustrating an updating process of an arc 32 (referring to FIG. 4) of an averaged locus averaging a front end point running locus at every time the latest sample point is updated according to a second embodiment of the present invention;

FIG. 7 is a flow chart illustrating a main routine performed by a controller;

FIG. 8 is a flow chart illustrating an initializing process according to a first embodiment of the present invention;

FIG. 9 is a flow chart illustrating an interrupting process according to the first and second embodiments of the present invention;

FIG. 10 is a flow chart illustrating a normal rear-wheel steering angle calculating process according to the first and second embodiments of the present invention;

FIG. 11 is a flow chart illustrating a limited rear-wheel steering angle calculating process according to the first embodiment of the present invention;

FIG. 12 is a flow chart illustrating a limited rear-wheel steering angle calculating process according to the second embodiment of the present invention;

FIG. 13 is a flow chart illustrating an initializing process according to the second embodiment of the present invention;

FIG. 14 is a flow chart illustrating a limited rear-wheel steering angle smoothing calculating process according to the first and second embodiments of the present invention;

FIG. 15 is a flow chart illustrating a target rear-wheel steering angle limiting calculating process according to the first and second embodiments of the present invention;

FIG. 16 is a diagram illustrating a map of a rear-wheel/front-wheel steering angle ratio associated to a steering angle proportional control;

FIG. 17 is a diagram schematically illustrating a process of a bridge calculation according to the first and second embodiments of the present invention:

FIG. 18 is a diagram illustrating results of simulations of a vehicle running locus in a case for applying various control means when the vehicle is assumed to u-turn under a predetermined condition; and FIG. 19 is a diagram illustrating transitions of a vehicle speed V, a target rear-wheel steering angle δ rt, and a steering angle when vehicle dynamic simulations are performed under the same condition as FIG. 18.

DETAILED DESCRIPTION OF THE INVENTION

A basic structure of a 4WS vehicle 1 and an operation of a rear-wheel steering angle device of the 4WS vehicle 1 are described referring to FIG. 1. In the 4WS vehicle 1, wheel speed sensors 9 (a detecting means) are disposed at front wheels 3 for detecting a vehicle speed of the vehicle 1 based upon an output thereof. The vehicle wheel speed sensors 9 outputs pulses at every predetermined rotational angle of the front wheels 3. Therefore, the wheel speed sensors 9 can be also employed as mileage sensors by counting the number of pulses reckoned from a vehicle starting time. An actuator 15 (a rear-wheel steering angle control means) is connected to rear wheels 5 for steering the rear wheels 5. An actual rear-wheel steering angle sensor 13 (the detecting means) is equipped to the actuator 15. An actual front-wheel steering angle sensor 11 (the detecting means) is equipped to a steering 7 for detecting an actual steering amount of the front wheels 3 steered corresponding to a rotation of the steering 7. The vehicle 1 is further provided with a shift position sensor 23 for detecting a shift position of a transmission (not shown) and a yaw rate sensor 17 for detecting a yaw rate of the vehicle 1. The outputs from the above described sensors are inputted to a controller 21 (the rear-wheel steering angle control means, a target rear-wheel steering angle calculating means), respectively. The controller 21 calculates an optimal target rear-wheel steering angle based upon the outputs from the sensors and outputs a command signal to the actuator 15. The actuator 15 then steers the rear wheels 5 for controlling the actual rear-wheel steering angle to be approximately equal to the target rear-wheel steering angle.

Hereinafter, the rear-wheel steering angle control device of the present invention is described focusing on how the target rear-wheel steering angle is set and how the steering angle of the rear wheels 5 is controlled referring to FIGS. 2 through 17.

Referring to FIG. 4, a point a represents a front end point and a point f represents a rear end point. The front end point a and the rear end point b can be located at each predetermined point as far as a line, of which both ends are the points a and b, can be arranged in parallel to a vehicle longitudinal direction. According to the present invention, the front end point a is located at the vehicle most front edge portion and the rear end point f is located at the vehicle most rear edge portion. A vehicle absolute value θ b, a front end point running direction angle θ fe, an angle θ feao, an angle θ fear, a rear end point running direction angle θ re are respectively expressed as absolute angles and are set to be positive in a counterclockwise direction relative to the vehicle longitudinal direction to be the value zero upon switching on an ignition switch 19 (referring to FIG. 1) on the level of FIG. 4. A vehicle slip angle β b, a front-wheel steering angle δ f, and a rear-wheel steering angle δ r are respectively expressed as relative angles and are set to be positive in a counterclockwise direction relative to the vehicle longitudinal direction on the level of FIG. 4.

Points a, b, c, d represent sample points on a running locus of the front end point. A curved line 30 represents an actual running locus of the front end point. As illustrated in FIG. 4, the point a represents a current position of the front end point (the latest sample point). The latest sample point is updated in synch with a timing when the wheel speed sensors 9 output the pulse at every rotation of the front wheels 3 by the predetermined rotational angle. Therefore, a sample distance Dx representing a distance between the sample points corresponds to a mileage of the vehicle 1 when the front wheels 3 are rotated at the predetermined rotational angle.

An arc 32 represents an averaged locus defined by smoothly averaging the curved line 30 representing the actual running locus of the front end point by means of an arc. The arc 32 representing the averaged locus is updated at every time when the latest sample point is updated. A point e represents the nearest point to the rear end point on the averaged locus. The point e is defined by returning the front end point from the latest sample point a by a distance k·Dx (a predetermined distance) in a direction of the rear end point f. The symbol K is expressed as a natural number which is calculated by rounding-off a value of Le (a vehicle entire longitudinal length) divided by the sample distance Dx. Therefore, the distance k·Dx is approximately equal to the vehicle entire longitudinal length, i.e. a distance between the front end point and the rear end point. In this case, the nearest point to the rear end point on the averaged locus e is in the vicinity of the rear end point f. The angle $\theta$ fear represents a front end point running direction angle on the averaged locus at the nearest point to the rear end point on the averaged locus e. As illustrated in FIG. 4, the vehicle 1 rounds to the left side. In this case, an inner range of the arc 32 (the averaged locus of the front end point) designates a left side range in the vehicle running direction relative to the arc 32 (the left side in FIG. 4). Therefore, a target rear-wheel steering angle $\delta$ rt is successively calculated not to deviate the rear end point f to the right side range in the vehicle running direction relative to the arc 32 (the right side in FIG. 4). Hereinafter, "the inner range of the averaged locus of the front end point" designates a right side range relative to the running direction of the averaged locus of the front end point when the vehicle turns to the right side. On the other hand, "the inner range of the averaged locus of the front end point" designates the left side range relative to the running direction of the averaged locus of the front end point when the vehicle turns to the left side.

An angle $\theta$ et represents a deviation angle between a line connecting the latest sample point a and the rear end point f and the other line connecting the latest sample point a and the nearest point to the rear end point on the averaged locus e. The angle $\theta$ et is calculated to be a positive value when the rear end point f and the point e are located as illustrated in FIG. 4. At the meant time, the angle $\theta$ et is calculated to be a negative value when the rear end point f and the point e are located in a reverse manner relative to the latest sample point a. The deviation angle $\theta$ et corresponds to a tolerable amount related to a deviation between the rear end point f and the point e. The deviation angle $\theta$ et and the angle $\theta$ fear are important parameters for calculating a discrete limited target rear-wheel steering angle $\delta$ limit, as described later. As described above, the nearest point to the rear end point on the averaged locus e is preferably set in the vicinity of the rear end point f. Therefore, the tolerable amount related to the deviation between the rear end point f and the point e can be calculated with higher accuracy.

Next, a main routine performed by the controller 21 is described below with reference to FIG. 7 upon controlling the steering angle of the rear wheels 5 by the rear-wheel steering angle control device of the present invention.

The program performed by the controller 21 proceeds to step 101 after switching on the ignition switch 19, wherein each variable is initialized. The initializing process of each variable is illustrated more specifically in FIG. 8. When the initializing process is completed, the program proceeds to step 102. The process from step 102 to step 109 is a loop process repeatedly performed. While the loop process has been repeatedly performed, the pulse outputted from the wheel speed sensors 9 is inputted to the controller 21 corresponding to the running of the vehicle 1. More particularly, a pulse inputting process illustrated in FIG. 9 is performed as an interrupting process at every time the pulse is inputted to the controller 21, as required.

At step 102, the controller 21 judges whether or not a control period Ts (e.g. 6 msec) has passed already. The next process is withheld unless the control period Ts has passed yet. The program proceeds to step 103 when the control period Ts has passed, wherein signals from various sensors including the wheel speed sensors 9, the front-wheel steering angle sensor 11 are inputted to the controller 21 for assessing the current vehicle condition.

At step 104, a normal rear-wheel steering angle calculation can be performed based upon the sensor signals inputted at step 103 (referring to FIG. 10). The normal rear-wheel steering angle calculation is performed by the controller 21 for calculating a normally controlled target rear-wheel steering angle $\delta$ rt0 based upon a fundamental control rule so as to calculate the optimal target rear-wheel steering angle $\delta$ rt. According to the present invention, a steering angle proportional control is applied as the fundamental control rule. More specifically, as illustrated in FIG. 16, the normally controlled target rear-wheel steering angle $\delta$ rt0 is calculated to be in an opposite direction to the actual front-wheel steering angle $\delta$ f when the vehicle is running at a predetermined vehicle speed or less than that, and yet is calculated to be in the same direction as the actual front-wheel steering angle $\delta$ f when the vehicle is running at a greater speed than the predetermined vehicle speed. The normally controlled target rear-wheel steering angle $\delta$ rt0 is normally employed as the target rear-wheel steering angle $\delta$ rt which is ultimately to be calculated by the controller 21. Exceptionally, when the normally controlled target rear-wheel steering angle $\delta$ rt0 exceeds a continuous limited target rear-wheel steering angle $\delta$ rlimits calculated at step 107, the continuous limited target rear-wheel steering angle $\delta$ limits is employed as the target rear-wheel steering angle $\delta$ rt (referring to step 108 described later). When the vehicle 1 is running at the predetermined vehicle speed or greater than that in a state where the normally controlled target rear-wheel steering angle $\delta$ rt0 is calculated to be in the same direction as the actual front-wheel steering angle $\delta$ f, the swing-out at the vehicle rear end is not raised as an issue to be solved. In this case, the normally controlled target rear-wheel steering angle $\delta$ rt0 is employed as the target rear-wheel steering angle $\delta$ rt which is ultimately to be calculated by the controller 21. Therefore, when the vehicle 1 is running at the predetermined vehicle speed or greater than that, the process from step 105 to step 108 is not performed. The process from step 105 to step 108 is performed only when the vehicle 1 is running at the predetermined vehicle speed or less than that, i.e. only when the normally controlled target rear-wheel steering angle $\delta$ rt0 is calculated to be in the opposite direction to the actual front-wheel steering angle $\delta$ f.

At step 105, the controller 21 judges whether or not the pulse inputting process as the interrupting process was performed. When the pulse inputting process is judged to have been performed, the program proceeds to step 106. When the pulse inputting process is judged to have not been performed yet, step 106 is skipped and the program directly proceeds to step 107. When the pulse inputting process is performed, the latest sample point is updated as described above. A limited rear-wheel steering angle calculation is performed at step 106. The ultimate calculated subject by means of the limited rear-wheel steering angle calculation is the discrete limited target rear-wheel steering angle $\delta$ rlimit. That is, at step 106, the discrete limited target rear-wheel steering angle $\delta$ rlimit is calculated in line with the pulse inputting timing, i.e. in line with the updating timing of the latest sample point. The limited rear-wheel steering angle calculation is described later.

At step 107, a limited rear-wheel steering angle smoothing calculation is performed, wherein the continuous limited target rear-wheel steering angle δ limits is calculated by bridging the discrete limited target rear-wheel steering angle δ rlimit discretely calculated at step 106. The limited rear-wheel steering angle smoothing calculation is described later.

At step 108, a target rear-wheel steering angle limiting calculation is performed, wherein the target rear-wheel steering angle δ rt is here calculated as the subject to be ultimately calculated by the controller 21. More specific process of this calculation is illustrated by a flow chart in FIG. 15. Referring to FIG. 15, the control 21 judges whether or not the actual front- wheel steering angle δ f is the positive value or the value zero. When the actual front-wheel steering angle δ f is judged to be the positive value or the value zero, the program proceeds to step 502, wherein a greater value (considering positive or negative) of either the normally controlled target rear-wheel steering angle δ rt0 or the continuous limited target rear-wheel steering angle δ limits is employed as the target rear-wheel steering angle δ rt. The angles δ rt0 and δ rlimits are both related to the rear-wheel steering angle calculated to be in the opposite direction to the front-wheel steering angle δ f. Therefore, the angles δ rt0 and δ rlimits are both negative values (or the value zero). Assuming that the angle δ rt0 is greater than the angle δ rlimits, i.e. assuming that an absolute value of the angle δ rt0 is smaller than an absolute value of the angle δ rlimits, the normally controlled target rear-wheel steering angle δ rt0 is employed as the target rear-wheel steering angle δ rt. At the mean time, assuming that the angle δ rlimits is greater than the angle δ rt0, i.e. assuming that the absolute value of the angle δ rlimits is smaller than the absolute value of the angle δ rt0, the target rear-wheel steering angle δ rt is required to be controlled. Therefore, the continuous limited target rear-wheel steering angle δ rlimits is employed as the target rear-wheel steering angle δ rt. As described above, the target rear-wheel steering angle δ rt is controlled (a target rear-wheel steering angle limiting means). On the other hand, when the actual front-wheel steering angle δ f is the negative value at step 501, the program proceeds to step 503, wherein a smaller value (considering positive or negative) of either the normally controlled target rear-wheel steering angle δ rt0 or the continuous limited target rear-wheel steering angle δ rlimits is employed as the target rear-wheel steering angle δ rt. In this case, the angles δ rt0 and δ rlimits are both positive values. Assuming that the angle δ rt0 is smaller than the angle δ limits, i.e. assuming that the absolute value of the angle δ rt0 is smaller than the absolute value of the angle δ rlimits, the normally controlled target rear-wheel steering angle δ rt0 is employed as the target rear-wheel steering angle δ rt. At the mean time, assuming that the angle δ rlimits is smaller than the angle δ rt0, i.e. assuming that the absolute value of the angle δ rlimits is smaller than the absolute value of the angle δ rt0, the target rear-wheel steering angle δ rt is required to be controlled. Therefore, the continuous limited target rear-wheel steering angle δ rlimits is employed as the target rear-wheel steering angle δ rt. As described above, the target rear-wheel steering angle δ rt is controlled (the target rear-wheel steering angle limiting means).

At step 109, a servo control for the rear-wheel steering angle δ r is performed, for example by a PID control, wherein the actual rear-wheel steering angle δ r becomes approximately equal to the target rear-wheel steering angle δ rt calculated at step 108. Therefore, the rear wheels 5 are steered to an appropriate steering angle and the swing-out at the vehicle rear end can be prevented.

Next, more details about the limited rear-wheel steering angle calculation routine executed at step 106 is described below with reference to FIG. 11. FIG. 5 is referred to for easily describing the calculating processes.

Referring to FIG. 5, the points a and e correspond to the latest sample point a and the nearest point to the rear end point on the averaged locus e in FIG. 4, respectively. The distance k·Dx representing a length of the arc 32 of which both ends are the points a and e corresponds to a central angle k·θ ato of the arc 32. As aforementioned, it is the discrete limited target rear-wheel steering angle δ rlimit which is the subject to be ultimately calculated by the limited rear-wheel steering angle calculation routine. Further, this routine is performed only when the pulse inputting process was performed.

Referring to FIG. 11, the latest sample point a is first updated at step 201. More particularly, the front end point running direction angle θ fe at the latest sample point a on the level of FIG. 5 is calculated by means of the formula shown at step 201. The latest sample point a is hence updated to a point a' based upon the front end point running direction angle θ fe and the sample distance Dx (a front end point locus memorizing means).

At step 202, a front end point locus angle on the averaged locus θ at is calculated by means of the formula shown at step 202. As illustrated in FIG. 5, the central angle of an arc 32' is calculated by multiplying the front end point locus angle on the averaged locus θ at by a value K. The calculation of the angle θ at substantially corresponds to updating the arc 32 of the averaged locus to the arc 32' (an averaged locus calculating means) and updating the nearest point to the rear end point on the averaged locus from the point e to a point e'. The point e' is defined on the arc 32 by advancing from the point e by the sample distance Dx in the direction of the latest sample point a on the arc 32. The arc 32' is in contact with the arc 32 on the point e' and runs through the latest sample point a'.

At step 203, a front end point running direction angle on the averaged locus θ fea at the latest sample point a' is calculated by means of the formula shown at step 203 with the angle θ at calculated at step 202.

At step 204, the deviation angle θ et (referring to FIG. 4, corresponding to the tolerable amount related to the deviation) is calculated by means of the formula shown at step 204 with the angle θ at calculated at step 202 and the angle θ fea calculated at step 203.

At step 205, the front end point running direction angle on the averaged locus θ fear (referring to FIG. 4) at the nearest point to the rear end point on the averaged locus e' is calculated by means of the formula shown at step 205 with the angle θ at calculated at step 202 and the angle θ fea calculated at step 203.

At step 206, a limited rear end point running direction angle θ relimit as a limited value of the rear end point running direction angle θ re at the rear end point f is calculated by means of the formula shown at step 206 with the deviation angle θ et calculated at step 204 and the angle θ fear calculated at step 205.

At step 207, the discrete limited target rear-wheel steering angle δ rlimit which is the subject to be ultimately calculated by the limited rear-wheel steering angle calculation routine is calculated by means of the formula shown at step 207 with the angle θ relimit calculated at step 206. According to the formula at step 207, the formula shown at step 207 is employed for calculating the rear-wheel steering angle δ r for approximately corresponding the rear end point running direction angle θ re at the rear end point f to the limited rear end point running direction angle θ relimit.

Next, a physical definition of the discrete limited target rear-wheel steering angle δ rlimit calculated at step 207 is described below. Assuming the formula at step 206 is θ relimit=θ fear without having a term:C1·θ et, the discrete limited target rear-wheel steering angle δ rlimit is calculated as the rear-wheel steering angle δ r for approximately corresponding the rear end point running direction angle θ re on the rear end point f to the front end point running direction angle on the averaged locus θ fear on the point e'. Even if the discrete limited target rear-wheel steering angle δ rlimit is calculated as described above, the rear end point f is not deviated from the inner side range of the arc 32' as the averaged locus. However, as illustrated in FIG. 4, even when the discrete limited target rear-wheel steering angle δ rlimit is loosened with the tolerable amount corresponding to the deviation angle θ et in a state where the deviation angle θ et exists, the rear end point f can be controlled not to be deviated from the inner range of the arc 32'. Therefore, the limited target rear-wheel steering angle δ rlimit can be more finely calculated surely preventing the swing-out at the vehicle rear end.

As described above, the limited rear-wheel steering angle calculation routine is assumed to be performed only when the rear-wheel steering angle is calculated in the opposite direction to the front-wheel steering angle. Therefore, it is preferable that the capability of the small turning circle be improved by loosening the discrete limited target rear-wheel steering angle δ rlimit, i.e. by increasing the absolute value of the discrete limited target rear-wheel steering angle 6 rlimit. Therefore, at step 206, the limited rear end point running direction angle θ relimit can be loosened according to the formula with the term:−C1·θ et shown at step 206. That is, the decreasing of the angle θ relimit corresponds to the increase of the absolute value of the angle δ rlimit. The discrete limited target rear-wheel steering angle δ rlimit is calculated for corresponding the rear end point running direction angle θ re at the rear end point f to the limited rear end point running direction angle θ relimit. As described above, the discrete limited target rear-wheel steering angle δ limit can be loosened as much as possible.

At step 208, the angle θ fea calculated at step 203 and the angle θ at calculated at step 202 are substituted for the previous angles θ feao and θ ato in preparation for the calculation at the next control period, respectively.

As described above, the limited rear-wheel steering angle calculation routine is completed. The program then returns to the main routine illustrated in FIG. 7.

Next, the limited rear-wheel steering angle smoothing calculation routine performed at step 107 is described with reference to FIG. 14. The continuous limited target rear-wheel steering angle δ rlimits is here calculated by bridging the discrete limited target rear-wheel steering angle δ rlimit discretely calculated at step 207 illustrated in FIG. 11. FIG. 17 is a diagram illustrating schematically the bridging calculating process. As illustrated at step 401 of FIG. 14, the continuous limited target rear-wheel steering angle δ rlimits is calculated by adding an increment calculated by multiplying a predetermined angle by the control period Ts into an angle δ rlimits1 which is a former δ rlimits by one control period. The predetermined gradient is denoted by a fractional expression. A denominator of the fractional expression is denoted as (t0−t1), i.e. a period of time required from the latest pulse inputting time t0 to a former pulse inputting time t1. A numerator of the fractional expression is denoted as (2 δ rlimit−δ rlimit1−δ rlimitst0), i.e. a value calculated by adding a value calculated by subtracting a continuous limited target rear-wheel steering angle δ rlimitst0 at the time t0 from the angle δ rlimit at the time t0 to a value calculated by subtracting a discrete limited target rear-wheel steering angle δ rlimit1 at the time t1 from the angle δ limit at the time t0.

More specifically, with reference to FIG. 17, the predetermined gradient is calculated to be greater by a gradient corresponding to the value (a deviation) calculated by subtracting the continuous value δ rlimitst0 at the time t0 from the discrete angle δ rlimit at the time t0 (a predetermined time) than a straight gradient connecting a point (t1, δ rlimit1) and the other point (t0, δ rlimit). That is, a continuous current limited target rear-wheel steering δ limits from the latest pulse inputting time t0 and a next pulse inputting time can be calculated based upon a previous variation (before the time t0) of the angle δ rlimits at least so as to offset the deviation generated between the discrete value δ rlimit at the time t0 and the continuous value δ rlimitst0 at the time t0.

As described above, according to the first embodiment of the present invention, the rear-wheel steering angle control device can effectively restrain the deviation generated between the discrete value δ rlimit, which will be calculated at the next pulse inputting time and the current continuous limited target rear-wheel steering angle δ rlimits, which will be calculated at the next pulse inputting time. Therefore, the current continuous limited target rear-wheel steering angle δ rlimits calculated at step 401 can be assumed to be a highly reliable value. Alternatively, the above described predetermined gradient can be a value (δ rlimit−δ rlimitst0)/(t0−t1) or (δ rlimit−δ rlimitst1)/(t0−t1). Each variable employed at the times t0, t1 and at step 401 has been initialized as illustrated by FIG. 8 at step 101 when the calculation was commenced. Each variable is then updated at every time the interrupting process illustrated in FIG. 9 is performed.

The program then proceeds to step 402 from step 401. The current angle δ rlimits is substituted for the angle δ rlimits1 of the previous δ rlimits in preparation for performing step 401 at the next control period.

As described above, the limited rear-wheel steering angle smoothing calculation routine is completed. The program returns to the main routine illustrated in FIG. 7 so that the target rear-wheel steering angle limiting calculation at step 108 is then performed.

Next, the rear-wheel steering angle control device according to a second embodiment of the present invention is described with reference to FIGS. 6, 12, 13. The description according to the second embodiment is referred only to a difference from the first embodiment.

The different points of the second embodiment from the first embodiment are an initializing process (referring to FIG. 13) denoted at step 101 and a limited rear-wheel steering angle calculation routine (referring to FIG. 12) denoted at step 106, which both are one of the steps of the main routine illustrated in FIG. 7.

Hereinafter, the limited rear-wheel steering angle calculation routine by the rear-wheel steering angle control device according to the second embodiment is described with reference to FIG. 12. FIG. 6 is referred to for easily describing the calculating processes. Referring to FIG. 6, the points a and e correspond to the latest sample point a and the nearest point to the rear end point on the averaged locus e on the level of FIG. 4, respectively. The subject to be ultimately calculated by this routine with reference to FIG. 12 is the discrete limited target rear-wheel steering angle δ rlimit as well as the limited rear-wheel steering angle calculation routine according to the first embodiment with reference to FIG. 11. Further, this routine according to the second embodiment is assumed to be performed only when the pulse inputting process was executed.

The different point of the limited rear-wheel steering angle calculation routine between the first and second embodiments are described below. According to the first embodiment, the arc 32 of which both ends are the latest sample point a and the nearest point to the rear end point on the averaged locus e is shaped of a single arc. On the other hand, according to the second embodiment, as illustrated in FIG. 6, a dividing point g is defined in the middle of the arc 32. The arc 32 is divided into two arc portions 32a, 32b that are connected to each other at the dividing point g for forming the arc 32. The dividing point g is defined by returning from the latest sample point a on the arc portion 32a by the distance k1·Dx. Hereinafter, the term: k1 represents the number of pulses from the dividing point g to the latest sample point a.

When the arc 32 as the averaged locus having the latest sample point a and the point e as both ends thereof is shaped of the single arc as illustrated in FIGS. 4, 5, the entire length of the arc 32 becomes long. In such a case, the arc 32 may be sheered into the inner range unnecessarily relative to the curved line 30 representing an actual running locus of the front end point. Further, the absolute value of the limited target rear-wheel steering angle can be calculated to be a smaller value, whereby the capability of the vehicle small turning circle may be deteriorated. At the meantime, when the arc 32 is divided into the arc portions 32a, 32b as illustrated in FIG. 6, the arc 32 can be approached closer to the curved line 30 representing the actual running locus of the front end point than the arc 32 according to the first embodiment, whereby the capability of the vehicle small turning circle can be improved.

Referring to FIG. 6, the arc portion 32a is provided with the latest sample point a and the dividing point g as both ends thereof. The updating of the arc portion 32a to an arc portion 32a' is executed recognizing the dividing point g as the point e on the level of FIG. 5 in the same manner as the updating of the arc 32 to the arc 32' on the level of FIG. 5. In this case, the dividing point g on the level of FIG. 6 is updated to a dividing point g' in response to the updating the nearest point to the rear end point on the averaged locus from the point e on the level of FIG. 5 to a point e'. The arc portion 32b is provided with the dividing point g and the nearest point to the rear end point on the averaged locus e as both ends thereof. The updating of the arc portion 32b to an arc portion 32b' is executed recognizing the dividing point g as the latest sample point a illustrated in FIG. 5 and recognizing the updated dividing point g' as the updated latest sample point a' illustrated in FIG. 5 in the same manner as the updating of the arc 32 to the arc 32' on the level of FIG. 5. In this case, the nearest point to the rear end point on the averaged locus e is updated to the nearest point to the rear end point on the averaged locus e' in response to the updating of the nearest point to the rear end point on the averaged locus from to the point e to the point e' on the level of FIG. 6.

The updating calculation of the arc portion 32a to the arc portion 32'a is performed following steps 301 through 304 of FIG. 12. The angle θ fear calculated at step 304 represents a front end point running direction angle on the averaged locus at the dividing point g' illustrated in FIG. 6. Further, the updating calculation of the arc portion 32b to the arc portion 32b' is performed following steps 305 thorough 307 of FIG. 12. The angle θ fear1 calculated at step 307 represents the front end point running direction angle on the averaged locus at the point e'.

Referring to FIG. 12, the program then proceeds to step 308 for calculating the deviation angle θ et by the formula shown at step 308. At step 309, the limited rear end point running direction angle θ relimit at the rear end point f is calculated with the angle θ et calculated at step 308 and the angle θ fear1 calculated at step 307 by means of the formula shown at step 309.

At step 310, the discrete limited target rear-wheel steering angle δ rlimit to be ultimately calculated by this routine is calculated with the angle θ relimit calculated at step 309 by means of the formula shown at step 310. The formula shown at step 310 is preset for calculating the rear-wheel steering angle for approximately corresponding the rear end point running direction angle θ re at the rear end point f to the limited rear end point running direction angle θ relimit. Steps 309, 310 corresponds to steps 206, 207, respectively. At step 311, each variable is memorized as a previous value in preparation for the calculation at the next control period. As described above, the limited rear-wheel steering angle calculation routine is completed and the program returns to the main routine illustrated in FIG. 7. Next, the limited rear-wheel steering angle smoothing calculation routine is performed at step 107.

The rear-wheel steering angle control device according to the first and second embodiments of the present invention can produce following effects. That is, the controller 21 controls the target rear-wheel steering angle δ rt so as not to deviate the vehicle rear end point f from the inner range of the averaged locus 32 defined by smoothly averaging the running locus of the front end point a. Therefore, even when the rear wheels 5 are controlled in the opposite direction to the front wheels 3 while the vehicle 1 runs at a low speed, the target rear-wheel steering angle δ rt is controlled so as no to deviate the rear end point f to an outer range relative to the averaged locus 32 of the front end point a. Therefore, the rear-wheel steering angle control device according to the first and second embodiments of the present invention can surely overcome the problem of the swing-out of the vehicle rear end point f.

Alternatively, the averaged locus calculating means can be omitted from this invention. In this case, the target rear-wheel steering angle is controlled not to deviate the rear end point from an inner range of the actual front end point running locus memorized by the front end point locus memorizing means. However, when the front end point running locus is directly referred to, the disorder of the front end point running locus may be reflected to the calculation of the limited target rear-wheel steering angle in a state where the disorder of the front end point running locus occurs due to complicated turning operation of the steering. Accordingly, the target rear-wheel steering angle calculated by the target rear-wheel steering angle calculating means may be fluctuated. Further, the capability of the vehicle small turning circle may be deteriorated. However, according to the first and second embodiments of the present invention, the target rear-wheel steering angle δ rt is controlled based upon the averaged locus 32. Therefore, even when the front end point running locus 30 is disordered, the target rear-wheel steering angle δ rt can be calculated being less influenced by the disorder of the front end point running locus 30. Therefore, according to the present invention, the capability of the vehicle small turning circle can be improved.

Still further, the continuous limited target rear-wheel steering angle δ rlimits is calculated with the deviation angle θ et representing the tolerable amount related to the deviation between the nearest point to the rear end point on the averaged locus e and the vehicle rear end point f. Therefore, when the deviation exists therebetween, the absolute value of the continuous limited target rear-wheel steering angle δ rlimits can be calculated to be a great value. Therefore, when the rear wheels 5 are steered in the opposite direction to the front wheels 3, the swing-out at the vehicle rear end point f can be surely overcome improving the capability of the small turning circle.

Still further, the arc 32 as the averaged locus can be updated based upon an information of the previously calculated arc 32 and the information on the latest sample point a when the latest sample point a is updated. Therefore, the controller 21 is required to memorize the only information about the latest sample point a for calculating the arc 32. That is, the controller 21 is not required to memorize the information about plural previous sample points. Further, the front end point running locus 30 is approximated by the arc 32 with geometric characteristics provided for an arc. Therefore, the averaged locus can be calculated more easily than complicated methods such as a polynomial approximation. Therefore, the rear-wheel steering angle control device according to the first and second embodiments of the present invention can save the workspace and the memory amount required for the controller 21 and can improve the calculating speed.

Still further, the current continuous limited target rear-wheel steering angle δ rlimits between the latest sample inputting time t0 and the next sample inputting time can be calculated taking account of at least not only the discrete limited target rear-wheel steering angle δ rlimit1 calculated at the previous sample inputting time t1 but also the continuous limited target rear-wheel steering angle δ rlimits at the latest sample inputting time t0. Therefore, the current continuous limited target rear-wheel steering angle δ rlimits calculated by bridging the discrete limited target rear-wheel steering angle δ rlimit1 can be a highly reliable value taking account of the deviation between the continuous limited target rear-wheel steering angle δ rlimits and the variation line of the previous limited target rear-wheel steering angle, the previous discrete limited target rear-wheel steering angle δ rlimit.

Still further, the discrete limited target rear-wheel steering angle is discretely calculated by the target rear-wheel steering angle limiting means when the latest sample point is inputted at every predetermined sample distance. The continuous limited target rear-wheel steering angle can be obtained by bridging the discrete limited target rear-wheel steering angle. Therefore, the above-described way for calculating the continuous limited target rear-wheel steering angle is optimal from a point of view an efficiency of a soft ware calculation.

Still further, the front end point a and the rear end point f are set at the most front edge portion and the most rear edge portion of the vehicle 1. Therefore, the vehicle most rear edge portion easily contactable with the obstacle at the vehicle side due to the swing-out of the vehicle rear end is not exposed to the outer side relative to the averaged locus 32. Therefore, the rear-wheel steering angle control device according to the present invention can surely prevent the vehicle rear edge portion form becoming in contact with the obstacle at the vehicle side.

FIG. 18 and FIG. 19 compares results of simulations for calculating the vehicle dynamics in the case of applying the rear-wheel steering angle control device in the conventional art and in the other case of applying the rear-wheel steering angle control device according to the present invention. FIG. 18 illustrates results of simulations for calculating the running locus of the vehicle in the case of applying 2WS vehicle (whose rear-wheel steering angle is zero), the steering angle proportional control, the control according to the first embodiment, and the control according to the second embodiment. The vehicle is assumed to U-turn under a predetermined condition in which the steering wheel angle is constantly fixed at 545° to the left side (the front-wheel steering angle :38.93 to the left side) and the vehicle speed is constantly fixed at 5 km/h. As described above, the steering angle proportional control is applied to the first and second embodiments as the normally controlled rear-wheel steering angle calculation. The normally controlled target rear-wheel steering angle δ rt0 of the vehicle controlled by the steering angle proportional control under the aforementioned condition is −10° in the opposite direction to the front-wheel steering angle.

As illustrated in FIG. 18, a turning width a in the case for applying the controls according to the first and second embodiments is greater than the turning width a in the case for applying the steering angle proportional control. However, the turning width a in the case for applying the controls according to the first and second embodiments is smaller than the turning width a in the case for applying the 2WS vehicle. A swing-out amount at the vehicle rear edge portion b in the case applying the controls according to the first and second embodiments is substantially equal to the swing-out amount at the vehicle rear edge portion b in the case for applying the 2WS vehicle. However, the swing-out amount at the vehicle rear edge portion b in the case for applying the controls according to the first and second embodiments is smaller than the swing-out amount at the vehicle rear edge portion b in the case for applying the steering angle proportional control.

Comparing the case for applying the first embodiment of the present invention with the other case for applying the second embodiment, the swing-out amounts at the vehicle rear edge potion b between these two cases are substantially same. However, the turning width a in the case for applying the second embodiment is smaller than the turning width a in the case for applying the first embodiment. That is, FIG. 18 shows that the capability of the small turning circle can be improved in the case for applying the control according to the second embodiment rather than in the case for applying the control according to the first embodiment. These results are entirely consistent with the expected results of the person skilled in this art. Namely, this present invention can provide the rear-wheel steering angle control device, which can wellcope with the improvement of the capability of the vehicle small turning circle and the reduction of the swing-out at the rear edge portion of the vehicle that are contrary to each other.

FIG. 19 illustrates transitions of the vehicle V, the target rear-wheel steering angle δ rt, and the steering angle when the vehicle dynamic simulation illustrated in FIG. 18 is performed. An actual rear-wheel steering angle δ m is preset to be zero as the vehicle leaves in the case for applying the controls according to the first and second embodiments.

Referring to FIG. 19, when the controls according to the first and second embodiments are applied, the normally controlled target rear-wheel steering angle δ rt0 is −10° by the normal rear-wheel steering angle calculation. However, in such a case, the target rear-wheel steering angle δ rt is limited to be zero for two or three seconds as the vehicle leaves. The target rear-wheel steering angle δ rt is then generally changed from zero to −10° (=δ rt0) (referring to ranges c and d on the level of FIG. 19). As described above, the swing-out at the vehicle rear edge portion b can be restrained.

Comparing the target rear-wheel steering angle δ rt calculated according to the first and second embodiments of the present invention, the angle δ rt according to the second embodiment becomes to zero earlier than the angle δ rt according to the first embodiment. As illustrated in FIG. 18, this result represents that the capability of the small turning circle can be improved in the case for applying the control according to the second embodiment rather than in the case for applying the control according to the first embodiment. As described above, the rear-wheel steering angle control device according to the present invention can wellcope with the improvement of the capability of the vehicle small turning circle and the reduction of the swing-out at the rear edge portion of the vehicle that are contrary to each other.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

I claim:

1. A rear-wheel steering angle control device, comprising:
    a detecting means for detecting at least a vehicle speed, an actual front-wheel steering angle, and an actual rear-wheel steering angle;
    a target rear-wheel steering angle calculating means for calculating a target rear-wheel steering angle based upon the detection by the detecting means;
    a rear-wheel steering angle control means for controlling the actual rear-wheel steering angle detected by the detecting means to be approximately equal to the target rear-wheel steering angle calculated by the target rear-wheel steering angle calculating means, and
    the target rear-wheel steering angle calculating means including:
        a front end point locus memorizing means for setting one end of a line located at a vehicle front side as a front end point and setting the other end of the line located at a vehicle rear side as a rear end point and for memorizing a front end point running locus as a sample point at every predetermined sample distance, the line being arranged to be parallel to a vehicle longitudinal direction;
        an averaged locus calculating means for calculating an averaged locus by averaging the front end point running locus based upon the sample point memorized by the front end point locus memorizing means; and
        a target rear-wheel steering angle limiting means for limiting the target rear-wheel steering angle not to deviate the rear end point from an inner range of the averaged locus.

2. A rear-wheel steering angle control device, according to claim 1, wherein the target rear-wheel steering angle limiting means includes:
    a means for calculating a front end point running direction angle on the averaged locus at the nearest point to the rear end point on the averaged locus, the nearest point being defined by returning from the latest sample point by a predetermined distance on the averaged locus in a direction of the rear end point;
    a means for calculating a tolerable amount related to a deviation between the rear end point and the nearest point to the rear end point on the averaged locus;
    a means for setting a value with the tolerable amount relative to the front end point running direction angle on the averaged locus as a limited rear end point running direction angle; and
    a means for calculating a limited target rear-wheel steering angle for approximately corresponding a rear end point running direction angle to the limited rear end point running direction angle.

3. A rear-wheel steering angle control device, according to claim 2, wherein the averaged locus calculated by the averaged locus calculating means is an arc to be updated at every time the latest sample point is updated, the updated arc has the updated latest sample point and a point of contact with a previously calculated arc, the point of contact is defined at a point advanced in a direction of the front end point by the sample distance from the nearest point to the rear end point on the averaged locus.

4. A rear-wheel steering angle control device, according to claim 2, wherein, the target rear-wheel steering angle limiting means includes:
    a limited target rear-wheel steering angle bridging means for calculating a continuous limited target rear-wheel steering angle by birding a discrete limited target rear-wheel steering angle at least calculated at a previous sample point inputting time, wherein a current continuous limited target rear-wheel steering angle from the latest sample point inputting time to a next sample point inputting time is calculated based upon the discrete limited target rear-wheel steering angle at least calculated at the previous sample point inputting time and the continuous limited target rear-wheel steering angle at a predetermined time before the latest sample point inputting time, and the current continuous limited target rear-wheel steering angle is calculated as the limited target rear-wheel steering angle.

5. A rear-wheel steering angle control device, according to claim 3, wherein, the target rear-wheel steering angle limiting means includes:
    a limited target rear-wheel steering angle bridging means for calculating a continuous limited target rear-wheel steering angle by birding a discrete limited target rear-wheel steering angle at least calculated at a previous sample point inputting time, wherein a current continuous limited target rear-wheel steering angle from the latest sample point inputting time to a next sample point inputting time is calculated based upon the discrete limited target rear-wheel steering angle at least calculated at the previous sample point inputting time and the continuous limited target rear-wheel steering angle at a predetermined time before the latest sample point inputting time, and the current continuous limited target rear-wheel steering angle is calculated as the limited target rear-wheel steering angle.

6. A rear-wheel steering angle control device, according to claim 1, wherein the front end point is set at the vehicle most front edge portion and the rear end point is set at the vehicle most rear edge portion.

7. A rear-wheel steering angle control device, according to claim 2, wherein the front end point is set at the vehicle most front edge portion and the rear end point is set at the vehicle most rear edge portion.

8. A rear-wheel steering angle control device, according to claim 3, wherein the front end point is set at the vehicle most front edge portion and the rear end point is set at the vehicle most rear edge portion.

9. A rear-wheel steering angle control device, according to claim 4, wherein the front end point is set at the vehicle most front edge portion and the rear end point is set at the vehicle most rear edge portion.

10. A rear-wheel steering angle control device, according to claim 5, wherein the front end point is set at the vehicle most front edge portion and the rear end point is set at the vehicle most rear edge portion.

11. A rear-wheel steering angle control device, according to claim 1, wherein the averaged locus is an approximate curved line calculated by means of a polynomial approximation to be updated at every time the latest sample point is updated.

12. A rear-wheel steering angle control device according to claim 2, wherein the nearest point to the rear end point on the averaged locus is defined by returning from the latest sample point by the predetermined distance approximately corresponding to a vehicle longitudinal distance.

13. A rear-wheel steering angle control device according to claim 1, wherein the detecting means includes wheel speed detecting sensors disposed at front wheels for detecting the vehicle speed, an actual front-wheel steering angle sensor for detecting the actual front-wheel steering angle, and an actual rear-wheel steering angle sensor for detecting the actual rear-wheel steering angle, the target rear-wheel steering angle calculating means includes a controller for calculating the target rear-wheel steering angle based upon the detection by the detecting means, the rear-wheel steering angle control means includes an actuator and the controller for controlling the actual rear-wheel steering angle to be approximately equal to the target rear-wheel steering angle.

14. A method for controlling a rear-wheel steering angle, comprising:

initializing variables to be inputted to a controller;

judging that a control period has passed;

inputting signals from various sensors;

calculating a normally controlled target rear-wheel steering angle;

judging whether or not a pulse inputting has been updated;

calculating a discrete limited target rear-wheel steering angle when the pulse inputting is judged to have been updated;

calculating a continuous limited target rear-wheel steering angle by bridging the discrete limited target rear-wheel steering angle;

calculating a target rear-wheel steering angle; and controlling an actual rear-wheel steering angle to be approximately equal to the target rear-wheel steering angle.

15. A method for controlling a rear-wheel steering angle, according to claim 14, wherein the discrete limited target rear-wheel steering angle is calculated by setting one end of a line located at a vehicle front side as a front end point and setting the other end of the line located at a vehicle rear side as a rear end point and for memorizing a front end point running locus as a sample point at every predetermined sample distance, the line being arranged to be parallel to a vehicle longitudinal direction;

memorizing a front end point running locus as a sample point at every predetermined sample distance;

averaging the front end point running locus by an arc;

calculating a front end point locus angle on the averaged locus;

updating the averaged locus at every time the latest sample point is updated;

calculating a front end point running direction angle on the averaged locus at the latest point based upon the front end point locus angle on the averaged locus;

calculating a deviation angle corresponding to a tolerable amount based upon the front end point locus angle on the averaged locus and the front end point running direction angle on the averaged locus;

calculating a front end point running direction angle on the averaged locus at the nearest point to the rear end point on the averaged locus based upon the front end point locus angle on the averaged locus and the front end point running direction angle on the averaged locus, the nearest point being defined by returning from the latest sample point by a predetermined distance on the averaged locus in a direction of the rear end point; and calculating a limited rear end point running direction angle based upon the deviation angle and the front end point running direction angle on the averaged locus at the nearest point to the rear end point on the averaged locus so that the discrete limited target rear-wheel steering angle is calculated based upon the limited rear end point running direction angle for approximately corresponding a rear end point running direction angle at the rear end point to the limited rear end point running direction angle.

16. A method for controlling a rear-wheel steering angle, according to claim 15, wherein the continuous limited target rear-wheel steering angle is calculated by bridging the discrete limited target rear-wheel steering angle, wherein the normally controlled target rear-wheel steering angle is controlled to be in an opposite direction to an actual front-wheel steering angle when the vehicle runs at a predetermined vehicle speed or less than that and is controlled in the same direction as the actual front-wheel steering angle when the vehicle runs at a greater vehicle speed than the predetermined vehicle speed, the normally controlled target rear-wheel steering angle is employed as the target rear-wheel steering angle when the normally controlled target rear-wheel steering angle is controlled in the same direction as the actual front-wheel steering angle and the normally controlled target rear-wheel steering angle is employed as the target rear-wheel steering angle until an absolute value of the normally controlled target rear-wheel steering angle becomes greater than an absolute value of the continuous limited target rear-wheel steering angle.

* * * * *